(12) United States Patent
Kwak et al.

(10) Patent No.: US 9,250,096 B2
(45) Date of Patent: Feb. 2, 2016

(54) APPARATUS AND METHOD FOR BROWSING A MAP DISPLAYED ON A TOUCH SCREEN

(75) Inventors: Hyun-Mi Kwak, Gyeonggi-do (KR); Moon-Bae Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 13/456,908

(22) Filed: Apr. 26, 2012

(65) Prior Publication Data

US 2012/0311482 A1 Dec. 6, 2012

(30) Foreign Application Priority Data

May 30, 2011 (KR) ........................ 10-2011-0051367

(51) Int. Cl.
G06F 3/00 (2006.01)
G01C 21/36 (2006.01)
G06F 3/0488 (2013.01)
G06F 3/0485 (2013.01)
G09B 29/00 (2006.01)
G06F 3/01 (2006.01)

(52) U.S. Cl.
CPC ............ *G01C 21/367* (2013.01); *G06F 3/0485* (2013.01); *G06F 3/0488* (2013.01); *G09B 29/005* (2013.01); *G09B 29/007* (2013.01)

(58) Field of Classification Search
USPC ................................... 715/781, 788, 772, 765
See application file for complete search history.

(56) References Cited

U.S. PATENT DOCUMENTS

| 4,030,218 | A  | * | 6/1977  | Stockwell ....................... 40/530 |
| 7,400,783 | B2 | * | 7/2008  | Sheu .............................. 382/294 |
| 2004/0130669 | A1 | * | 7/2004  | Shin et al. ...................... 348/744 |
| 2005/0137791 | A1 | * | 6/2005  | Agrawala et al. ............. 701/209 |
| 2006/0041556 | A1 | * | 2/2006  | Taniguchi et al. .............. 707/10 |
| 2006/0155429 | A1 | * | 7/2006  | Boone et al. ....................... 701/1 |
| 2006/0284852 | A1 | * | 12/2006 | Hofmeister et al. .......... 345/173 |
| 2008/0025639 | A1 | * | 1/2008  | Widdowson et al. .......... 382/284 |
| 2008/0158189 | A1 | * | 7/2008  | Kim ............................. 345/173 |
| 2009/0106689 | A1 | * | 4/2009  | Miller ........................... 715/788 |
| 2009/0195500 | A1 | * | 8/2009  | Huang et al. .................. 345/157 |
| 2009/0281719 | A1 | * | 11/2009 | Jakobson ....................... 701/201 |
| 2010/0097338 | A1 | * | 4/2010  | Miyashita et al. ............ 345/173 |
| 2010/0122168 | A1 | * | 5/2010  | Silberstein et al. ........... 715/719 |
| 2010/0201645 | A1 | * | 8/2010  | Asami ........................... 345/173 |
| 2010/0218137 | A1 | * | 8/2010  | Sim et al. ...................... 715/788 |
| 2010/0283750 | A1 | * | 11/2010 | Kang et al. .................... 345/173 |
| 2011/0035691 | A1 | * | 2/2011  | Kim ............................. 715/765 |
| 2011/0163874 | A1 | * | 7/2011  | van Os ...................... 340/539.13 |
| 2011/0164065 | A1 | * | 7/2011  | Mate et al. .................... 345/676 |
| 2011/0187741 | A1 | * | 8/2011  | Akiya et al. .................. 345/625 |
| 2011/0242136 | A1 | * | 10/2011 | Yamada et al. ............... 345/660 |
| 2012/0001773 | A1 | * | 1/2012  | Lyons et al. .................. 340/970 |
| 2012/0084697 | A1 | * | 4/2012  | Reeves ......................... 715/772 |

(Continued)

*Primary Examiner* — Amy Ng
*Assistant Examiner* — Toan Vu
(74) *Attorney, Agent, or Firm* — The Farrell Law Firm, P.C.

(57) ABSTRACT

A method and apparatus for browsing a map displayed on a device including a touch screen display. The method includes displaying the map on a full screen of the touch screen display; receiving a user input for setting a variation axis on the map; setting the variation axis according to the user input; dividing the full screen into a first area and a second area, using the variation axis as a boundary; receiving a first map shift command in the first area; and shifting a displayed portion of the map in the first area and maintaining a displayed portion of the map in the second area, in response to the first map shift command in the first area.

18 Claims, 10 Drawing Sheets

(56) References Cited

U.S. PATENT DOCUMENTS

| | | | |
|---|---|---|---|
| 2012/0221687 A1* | 8/2012 | Hunter et al. | 709/219 |
| 2012/0229501 A1* | 9/2012 | Hosokawa et al. | 345/620 |
| 2013/0250043 A1* | 9/2013 | Kostrzewski et al. | 348/36 |

* cited by examiner

APPARATUS AND METHOD FOR BROWSING A MAP DISPLAYED ON A TOUCH SCREEN

PRIORITY

The present application claims priority under 35 U.S.C. §119(a) to a Korean patent application, which was filed in the Korean Intellectual Property Office on May 30, 2011, and assigned Serial No. 10-2011-0051367, the entire content of which is incorporated herein by reference.

BACKGROUND OF THE INVENTION

1. Field of the Invention

The present invention relates generally to a touch screen device, and more particularly, to an apparatus and method for browsing of a map displayed on a touch screen.

2. Description of the Related Art

As portable terminals, e.g., a cellular phone, a Personal Communication System (PCS), a Personal Digital Assistant (PDA), an International Mobile Telecommunication-2000 (IMT-2000) terminal, a laptop computer, a tablet Personal Computer (PC), etc., are commonly used, service providers and terminal manufacturers often provide additional functions to increase utilization of these portable terminals. A map service provided by the portable terminal is an example of an additional function.

Often, the map service is provided by a portable terminal including a touch screen display, in such a manner that a user drags a specific point on the map to shift a displayed portion of the map.

Additionally, this type of browsing mechanism, based on dragging a point on a touch screen, is not only applicable to portable terminals, but also to other devices having a touch screen. For example, a large, fixed touch screen sign may be installed in a subway station, a downtown area, etc., which provides a map service with browsing capabilities as described above.

Specifically, browsing the displayed map is based on an interaction between a device and a user. That is, the device analyzes a user input to control a displayed portion of the map shown on a screen. As described above, a typical browsing mechanism shifts a displayed portion of the map by dragging, and also enlarges/shrinks the displayed portion, e.g., depending on a distance between a plurality of touch inputs. Herein, when shifting the displayed portion, all points on the screen are shifted equally by $\Delta x$ in a horizontal direction and by $\Delta y$ in a vertical direction. Because a position initially recognized by the user is often shifted outside the screen when shifting the displayed portion, the user loses recognized positions. Consequently, it becomes difficult for the user to recognize a previous browsing position, and thus, when intending to return to the previous browsing position, the user may not know a proper shift direction or may have to repeat the screen shift in an opposition direction.

As described above, when browsing the map, it is often difficult for a user to recognize a relative positional relationship between points recognized by the user, after shifting an originally displayed portion of the map.

SUMMARY OF THE INVENTION

The present invention is designed to substantially solve at least some of the above-described problems and/or disadvantages and to provide at least the advantages below.

Accordingly, an aspect of the present invention is to provide an apparatus and method for providing effective browsing of a map displayed on a touch screen.

Another aspect of the present invention is to provide an apparatus and method for maintaining an initially displayed location, even when a displayed portion is shifted, when browsing a map displayed on a touch screen.

Another aspect of the present invention is to provide an apparatus and method for browsing a map displayed on a touch screen using a variation axis.

In accordance with an aspect of the present invention, a method of browsing a map displayed on a device including a touch screen is provided. The method includes displaying the map on a full screen of the touch screen display; receiving a user input for setting a variation axis on the map; setting the variation axis according to the user input; dividing the full screen into a first area and a second area, using the variation axis as a boundary; receiving a map shift command in the first area; and shifting a displayed portion of the map in the first area and maintaining a displayed portion of the map in the second area, in response to the map shift command in the first area.

In accordance with another aspect of the present invention, a device providing a map display function is provided. The device includes a map data provider for providing map data for the map display function; a touch screen display for displaying a map based on the map data on a full screen of the touch screen display, and receiving a user input for setting a variation axis on the map; and a processor for setting the variation axis according to the user input, for dividing the full screen into a first area and a second area, using the variation axis used as a boundary, and when a map shift command is received in the first area by the touch screen display, for shifting a displayed portion of the map in the first area while maintaining a displayed portion of the map in the second area, in response to the map shift command in the first area.

BRIEF DESCRIPTION OF THE DRAWINGS

The above and other aspects, features, and advantages of certain embodiments of the present invention will be more apparent from the following detailed description, when taken in conjunction with the accompanying drawings, in which.

DETAILED DESCRIPTION OF EMBODIMENTS OF THE INVENTION

Various embodiments of the present invention will be described in more detail herein below with reference to the accompanying drawings. In the following description, well-known functions or constructions are not described in detail, to avoid obscuring the present invention in unnecessary detail.

The present invention described below relates to a technique for effectively browsing a map in a device including a touch screen. The device may be a portable terminal or a fixed terminal.

In accordance with an embodiment of the present invention, a touch screen device operates in two modes, i.e., a normal browsing mode and a variation-axis browsing mode, for browsing a displayed map. In the normal browsing mode, a displayed portion of the map is shifted by dragging a point displayed on the map, and a displayed portion of the map is enlarged/shrunk depending on a distance between a plurality of touch inputs, as described above.

In the variation-axis browsing mode, however, a variation axis is generated by a plurality of touch inputs, such that the map is curved inwardly about the variation axis when shifting a displayed portion.

The normal browsing mode and the variation-axis browsing mode can also be transitioned by a pre-defined manipulation. For example, the mode transition manipulation may be an input of a special button included in the device, a key input of a specific pattern, a touch input of a specific pattern, a menu-assisted selection, etc.

FIGS. 1A to 1F are screen images illustrating map browsing in a touch screen device according to an exemplary embodiment of the present invention.

Referring to FIGS. 1A to 1F, two co-centric circles indicate a touch input, and an arrow mark that diverges from the co-centric circles indicates a drag direction of the touch input.

Figure 1A:
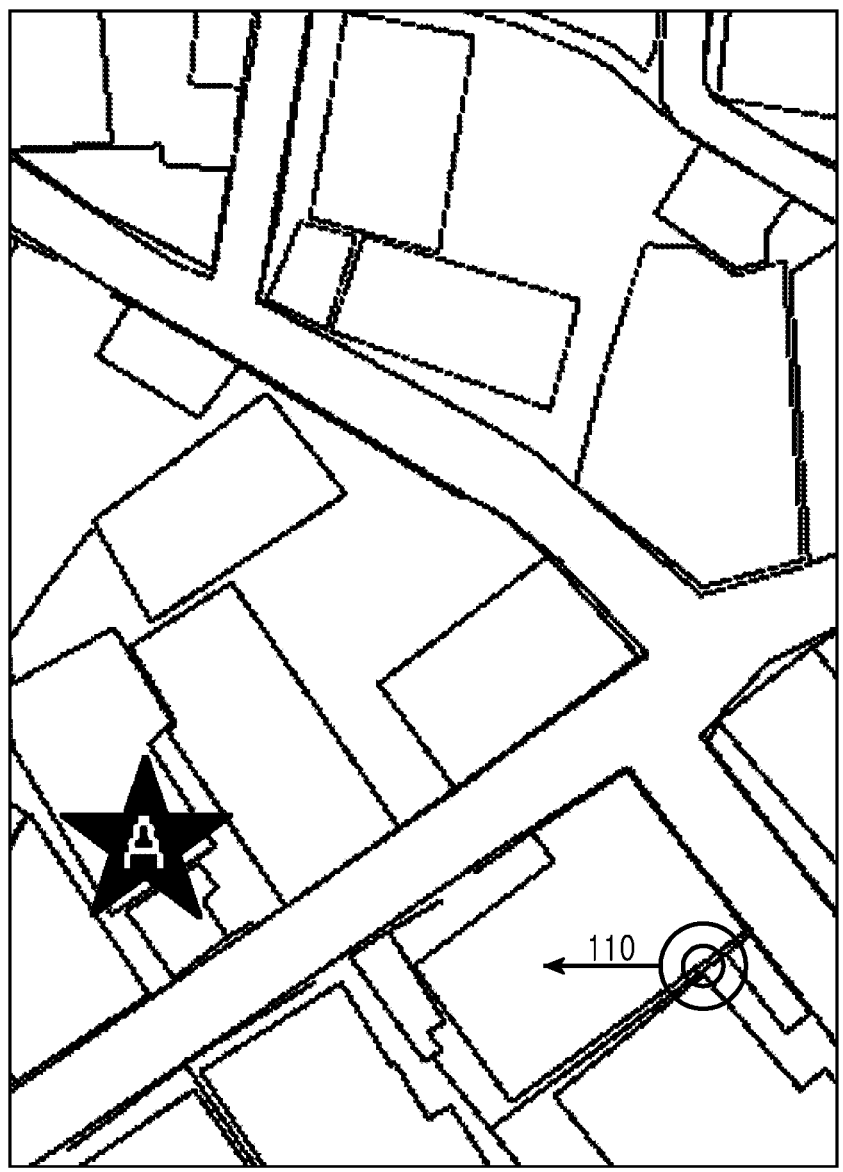
FIGS. 1A to 1F are screen images illustrating map browsing in a device having a touch screen, according to an embodiment of the present invention.
Figure 1B:
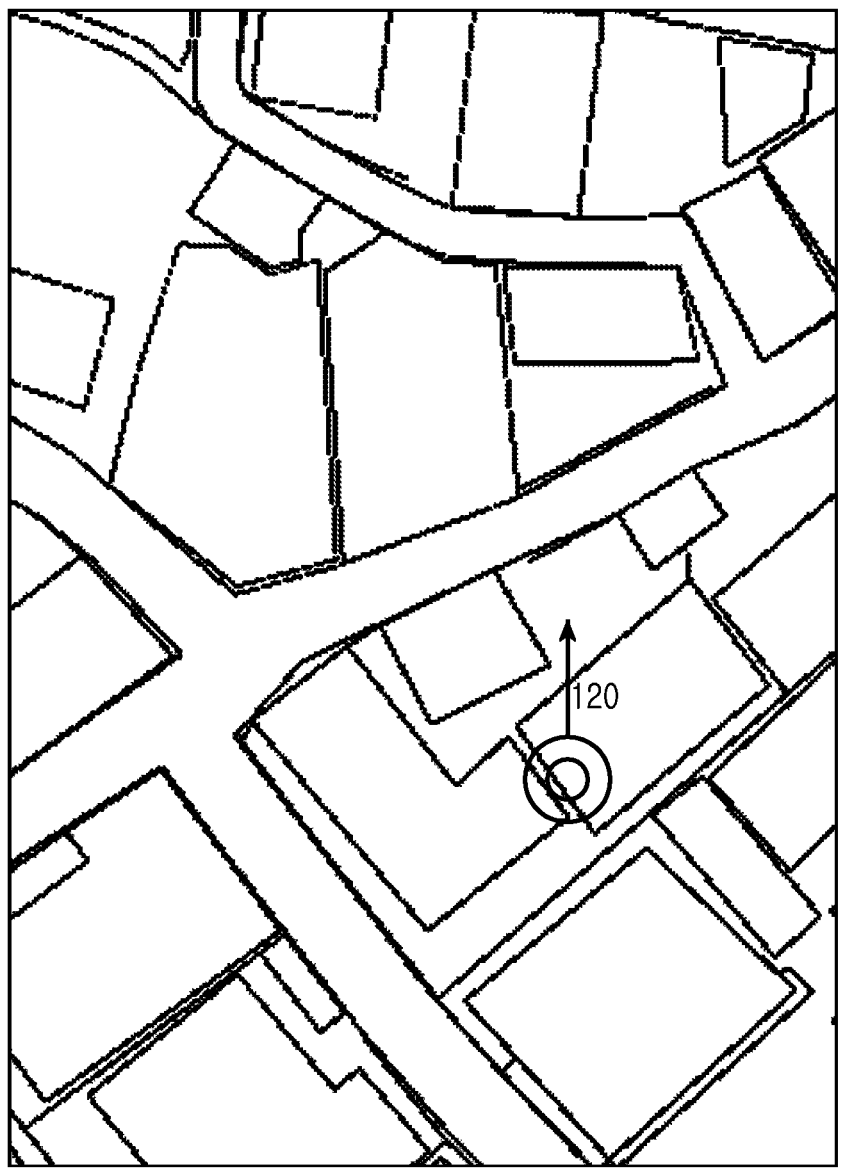

More specifically, FIG. 1A illustrates a state of the normal browsing mode. In FIG. 1A, upon generation of a touch input and drag 110, a displayed screen is shifted to the left in accordance with a direction of the drag, and the screen changes to FIG. 1B. As illustrated in FIG. 1B, after shifting the displayed portion of the screen based on the touch input and drag 110, point A in FIG. 1A is no longer displayed.

Figure 1C:
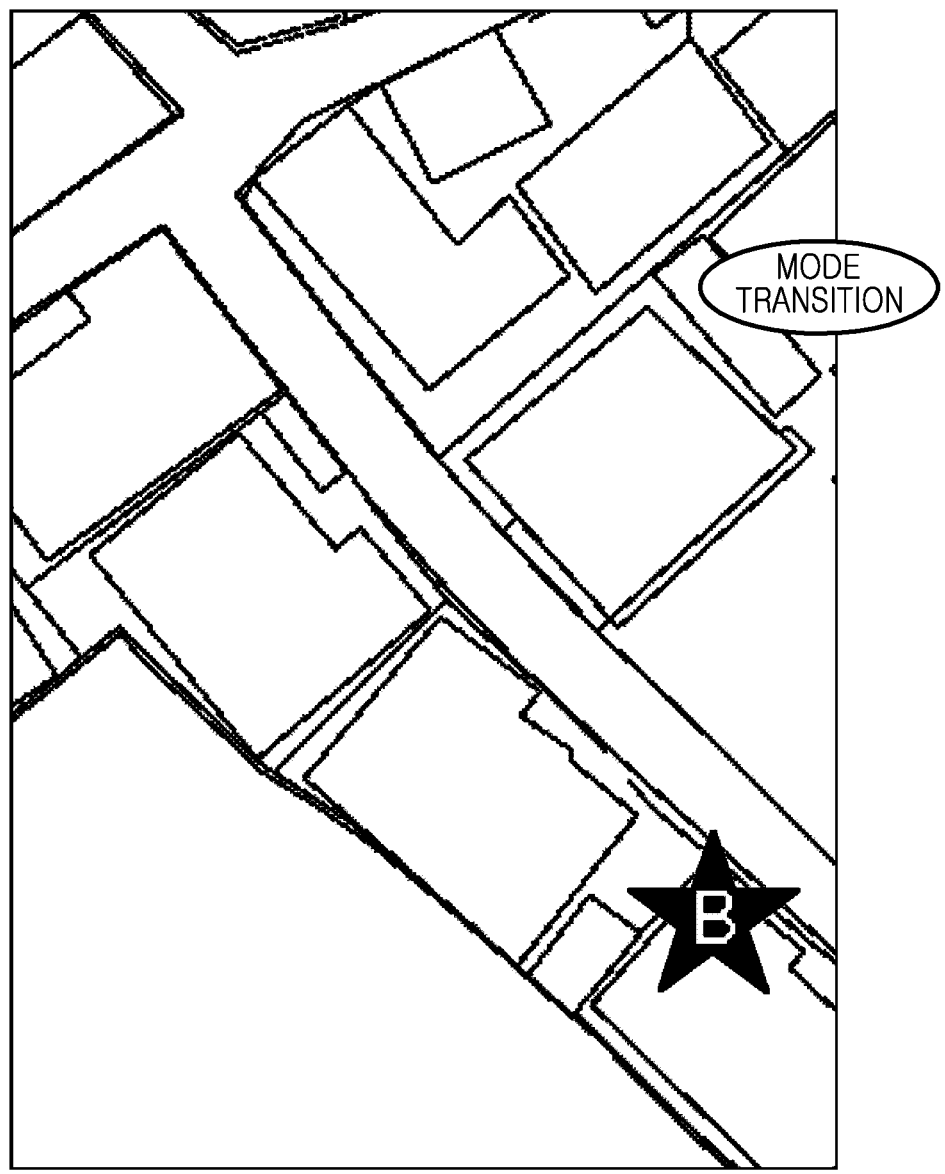

In FIG. 1B, upon generation of a touch input and drag 120, a displayed screen is shifted upwards in accordance with a direction of the drag, and the screen changes to FIG. 1C.

Figure 1D:
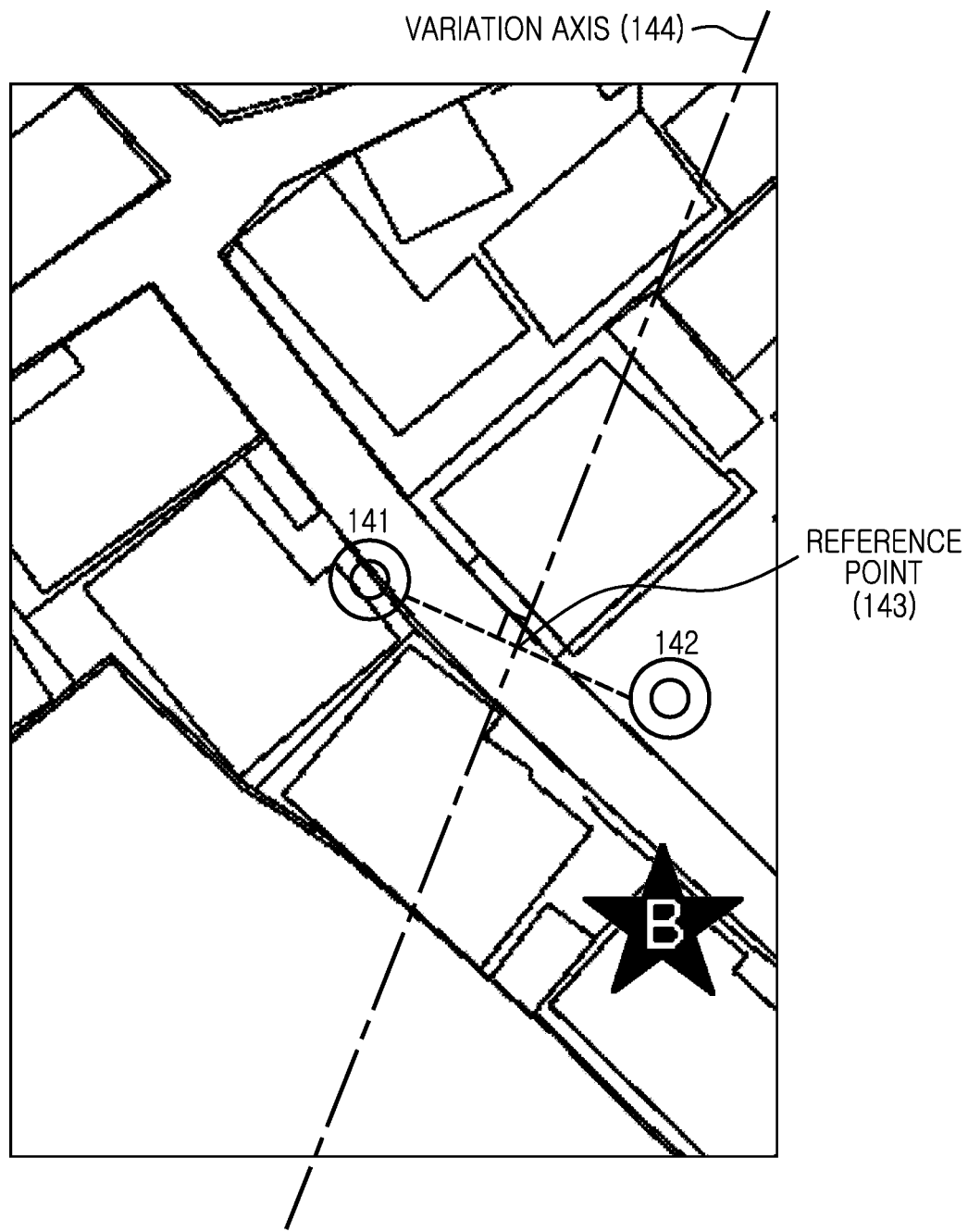

In FIG. 1C, when a user issues a mode transition command, the browsing mode is transitioned to the variation-axis browsing mode. After the mode transitioning, as illustrated in FIG. 1D, two touch inputs 141 and 142 are generated. In response, the device sets a middle point of the touch inputs 141 and 142 to a reference point 143, and sets an orthogonal line to a line that links the touch inputs 141 and 142 as a variation axis 144. That is, the touch inputs of the user are used to calculate an inclination of the variation axis 144, and the reference point 143 is used as a location of the variation axis 144. The variation axis 144 is used as a new boundary when browsing of the map.

Figure 1E:
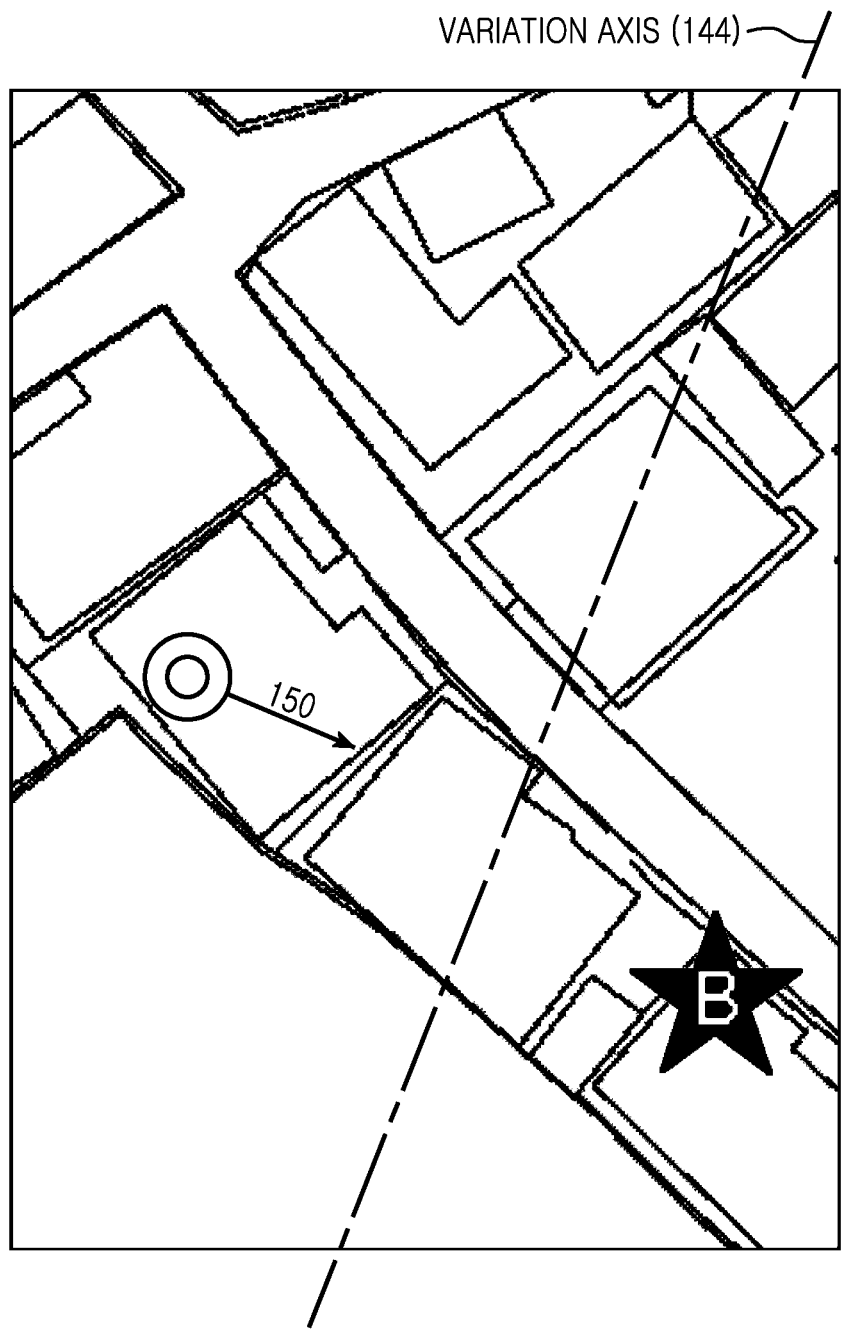
Figure 1F:
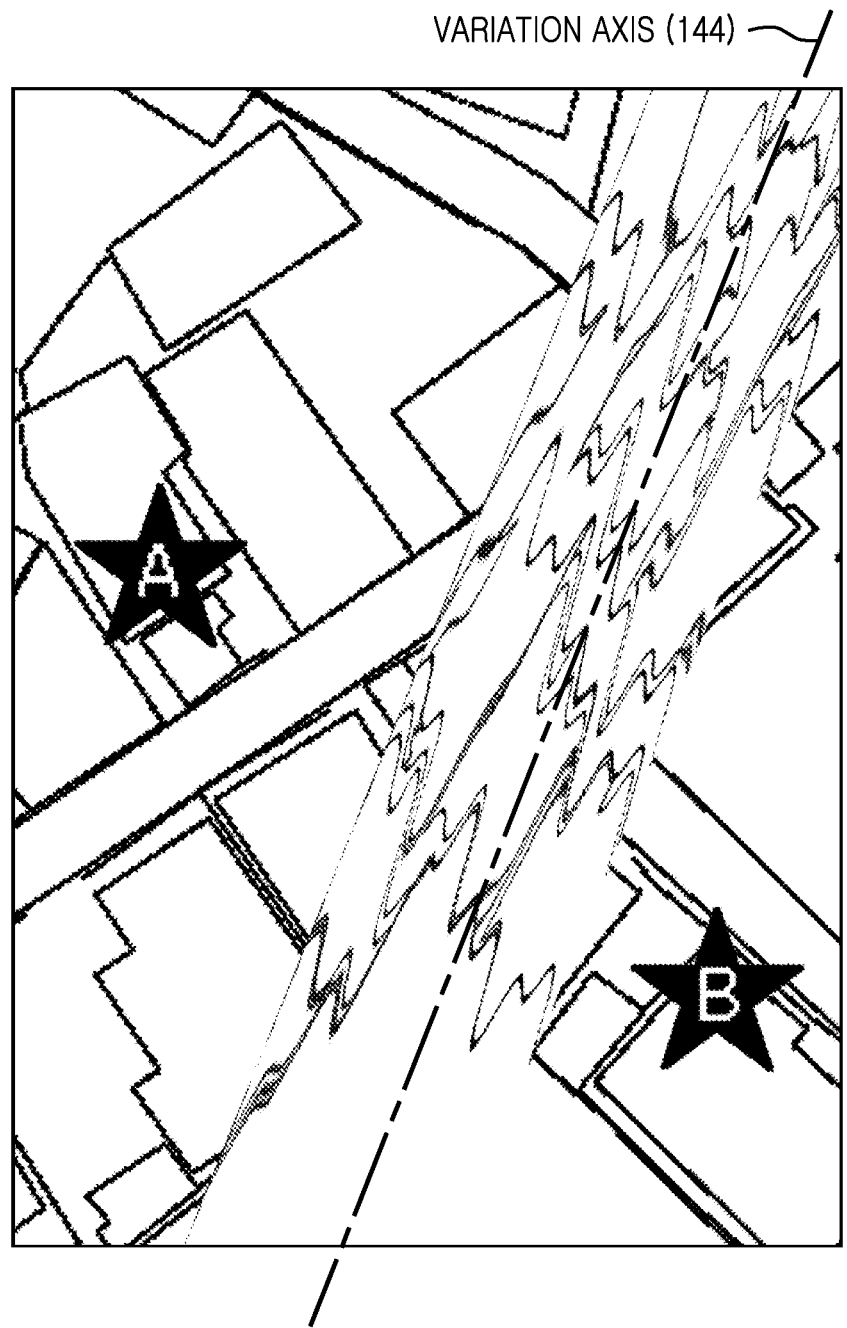

Referring to FIG. 1E, while operating in the variation-axis browsing mode, a touch input and drag 150 is generated in the left side of the variation axis 144. Accordingly, as illustrated in FIG. 1F, the map is distorted about the variation axis 144, and a displayed portion of a left area of the variation axis 144 is shifted while a displayed portion of a right area of the variation axis 144 does not shift. That is, the variation axis 144 is used as a boundary for an area where the map is shifted, such that the map is only shifted on the side of the variation axis 144 where the touch input is generated.

In addition, although not illustrated herein, if a touch input or drag is generated in the right area of the variation axis 144, the map is distorted about the variation axis 144, and the displayed portion of the right area of the variation axis 144 is shifted, while the displayed portion of the left area of the variation axis 144 does not shift.

Further, although not illustrated, if a touch input or drag is generated in each of the right area and the left area of the variation axis 144, the map is distorted about the variation axis 144, and each of the displayed portion of the right area of the variation axis 144 and the displayed portion of the left area of the variation axis 144 is shifted.

When distortion occurs about the variation axis 144, a mode transition to the normal browsing mode may occur by user manipulation. In this case, although not illustrated, the device displays the entire map without distortion.

According to an embodiment of the present invention, as described above, a touch screen device can display the map, while maintaining the left side or the right side of the variation axis 144, without changing the scale of the map.

According to another embodiment of the present invention, a device can display a map such that both of the left side and the right side of the variation axis 144 can be viewed, by decreasing the scale of the map.

As described above, when in the variation-axis browsing mode, the map is distorted about the variation axis, and thus, a plurality of points that cannot be displayed concurrently in the normal browsing mode, can be displayed concurrently in the variation-axis browsing mode.

Figure 2:
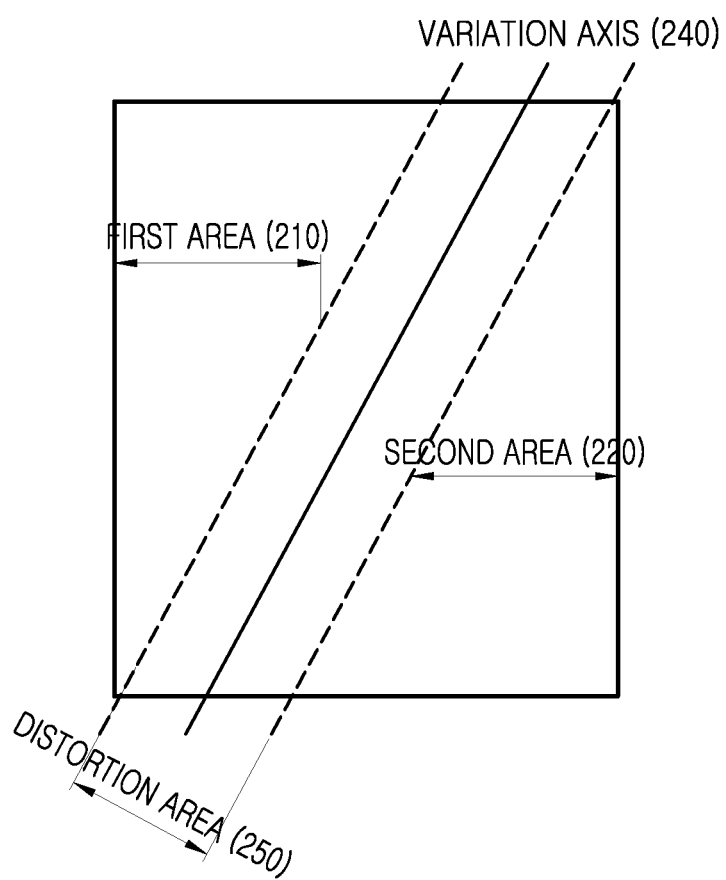
FIG. 2 illustrates a touch screen display divided by using variation-axis browsing according to an embodiment of the present invention.

FIG. 2 illustrates a touch screen display divided by using variation-axis browsing according to an embodiment of the present invention.

Referring to FIG. 2, when a variation axis 240 is set, a full screen is divided into three areas, i.e., a first area 210, a second area 220, and a distortion area 250.

The distortion area 250 has a specific width about the variation axis 240.

In accordance with an embodiment of the present invention, the width of the distortion area 250 may increase from an initial value, based on a level of shifting the map.

In accordance with another embodiment of the present invention, the width of the distortion area 250 may be fixed value, irrespective of the level of shifting the map.

The first area 210 is an area in which the map is shifted when a touch input and drag occurs at the left side of the variation axis 240. The second area 220 is an area in which the map is shifted when a touch input and drag occurs at the right side of the variation axis 240. The level of shifting the map in the first area 210 and the second area 220 is determined depending on a length of the drag.

As the first area 210 and the second area 220 are shifted in the map, the map is distorted in the distortion area 250. The distortion of the map can be presented in various manners.

Figure 3C:
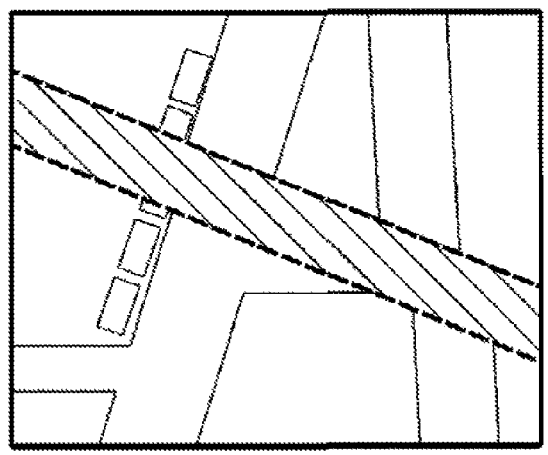
FIGS. 3A to 3C are screen images illustrating distortion areas in a touch screen device, according to different embodiments of the present invention.
Figure 3B:
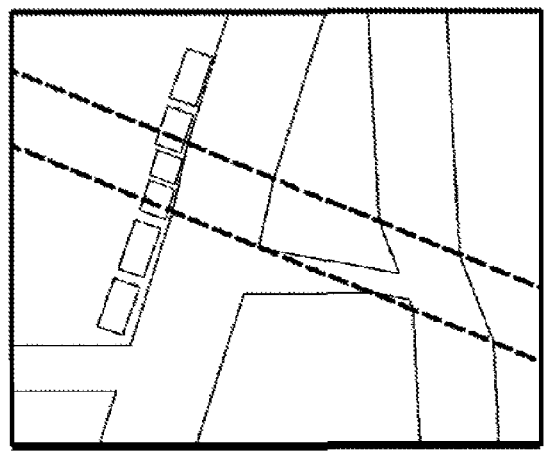
Figure 3A:
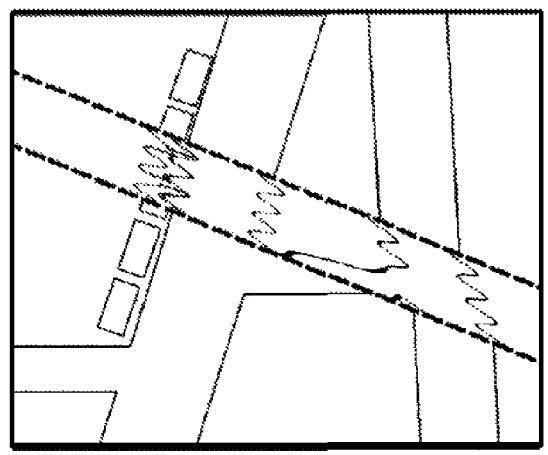

FIGS. 3A to 3C are screen images illustrating distortion areas in a touch screen device, according to different embodiments of the present invention.

Referring to FIG. 3A, the distortion of the map is presented in a graphic of a creased paper image.

Referring to FIG. 3B, the distortion of the map is presented in a graphic of an image being compressed in a widthwise direction.

Referring to FIG. 3C, the distortion of the map is presented in a graphic of an image filled with shadow or specific color.

Figure 4:
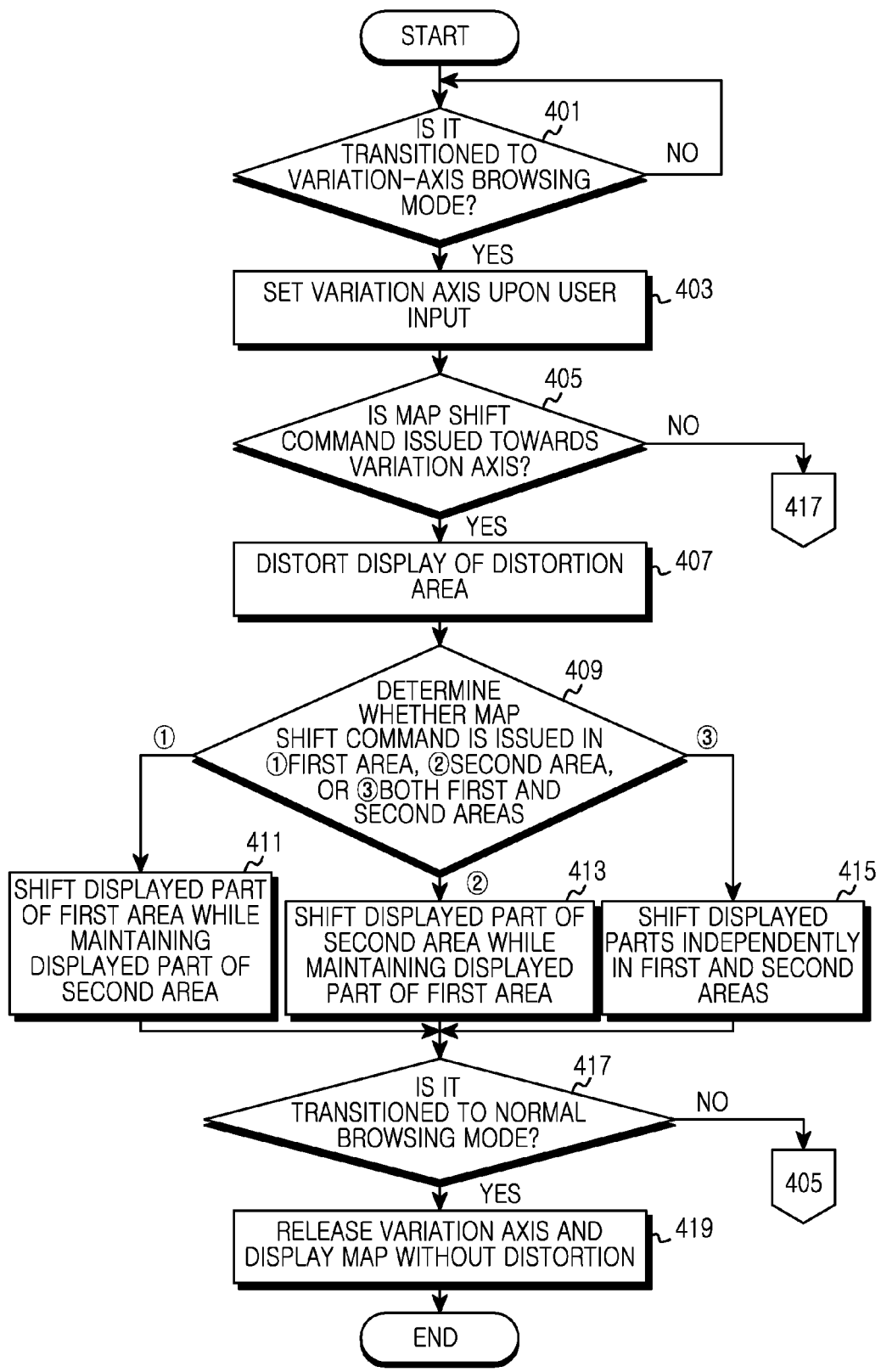
FIG. 4 is a flowchart illustrating a method of map browsing in a touch screen device, according to an embodiment of the present invention.

FIG. 4 is a flowchart illustrating a method of map browsing in a touch screen device, according to an embodiment of the present invention.

Referring to FIG. 4, in step 401, the device, which is performing a map service function in the normal browsing mode, determines whether there is a mode transition to the variation-axis browsing mode. For example, the device determines whether the mode transition to the variation-axis browsing mode is instructed by a user manipulation.

When there is a mode transition to the variation-axis browsing mode in step 401, the device switches from the normal browsing mode to the variation-axis browsing mode. However, when there is no mode transition to the variation-axis browsing mode in step 401, the device continues operation in the normal browsing mode, until a mode transition to the variation-axis browsing mode occurs.

Upon transitioning to the variation-axis browsing mode, in step 403, the device sets a variation axis according to a user input. For example, as illustrated in FIGS. 1D and 1F, the device determines whether two touch inputs are generated, and upon generation of the two touch inputs, sets a middle point of the touch inputs as a reference point, and sets the variation axis to a line orthogonal to a line that connects the touch inputs at the reference point. By setting the variation axis, a first area and a second area are identified by the variation axis used as a boundary, and a distortion area having a specific width about the variation axis is determined.

After setting the variation axis, in step 405, the device determines whether a map shift command is input to shift the map towards the variation axis. In other words, the device determines whether a user manipulation shifts the map so that a specific point is dragged closer to the variation axis.

Upon issuing of the map shift command towards the variation axis, in step 407, the device distorts a display of the distortion area. For example, as illustrated in FIGS. 3A to 3C, the distortion can be presented in a graphic including at least one of a creased paper image, an image being compressed in a widthwise direction, and an image filled with shadow or specific color.

In addition, the width of the distortion area may be increased from an initial value according to a level of shifting the map or may be a fixed value irrespective of the level of shifting the map.

Although not shown, if the issued map shift command does not towards the variation axis, the device can shift a displayed portion of a full screen in the same manner as the normal browsing mode instead of distorting the display of the distortion area.

In step 409, the device determines a specific area in which the map shift command of step 405 is received. That is, the device determines whether the map shift command is received in the first area, the second area, or both the first and second areas at the same time.

If the map shift command is received in the first area, in step 411, the device shifts the displayed portion of the first area while maintaining the displayed portion of the second area. That is, the device shifts the map displayed in the first area, using the variation axis used as the boundary.

If the map shift command is received in the second area, in step 413, the device shifts the displayed portion of the second area while maintaining the displayed portion of the first area. That is, the device shifts the map displayed in the second area, using the variation axis used as the boundary.

When map shift commands are received simultaneously in the first area and the second area, in step 415, the device shifts the displayed portion independently in each of the first area and the second area. That is, the device operates by performing both of step 411 and step 413.

In step 417, the device determines whether to transition to the normal browsing mode. If the mode transition to the normal browsing mode is not instructed, the method returns step 405, and the device continues to operate in the variation-axis browsing mode.

However, if the mode transition to the normal browsing mode is instructed, in step 419, the device releases the variation axis and displays the map without distortion in the normal browsing mode. That is, the device releases the variation axis, releases the distinction of the first area, the second area, and the distortion area, and thereafter displays the entire map without distortion.

In accordance with an embodiment of the present invention, when transitioning back to the normal browsing mode, the device can display the map while maintaining the displayed portion of one of the first area and the second area, without changing the scale of the map.

In accordance with another embodiment of the present invention, when transitioning back to the normal browsing mode, the device can display the map such that both of the displayed parts of the first area and the displayed portion of the second area can be viewed, by decreasing the scale of the map.

Although FIG. 4 illustrates a scenario in which the device determines whether the shift is toward the variation axis, according to another embodiment of the present invention, the device may determine whether the shift is away from the variation axis. For example, when the map shift command occurs away from the variation axis, the distortion may involve stretching the image in the distortion area. According to yet another embodiment of the present invention, shifting away from the variation axis enables the images being shifted to be enlarged based on the shift distance.

Figure 5:
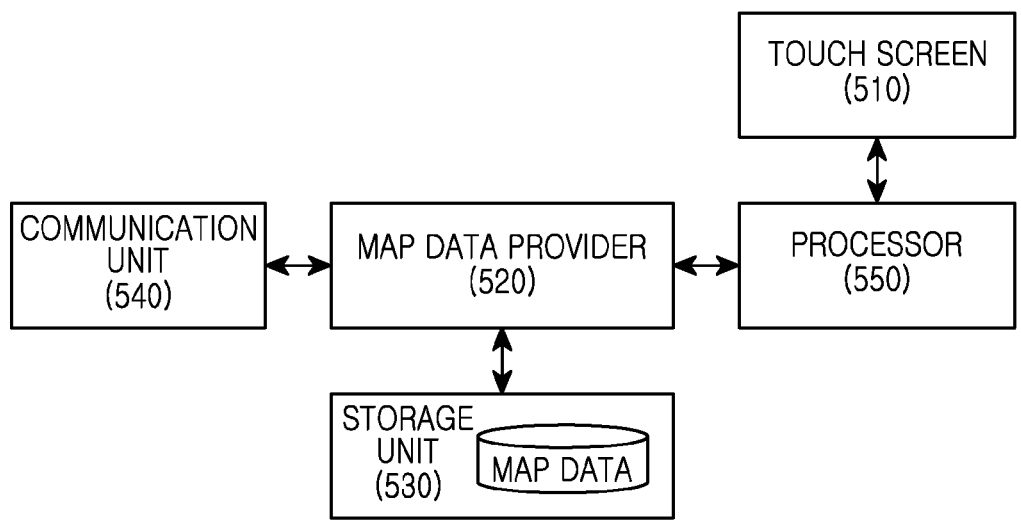
FIG. 5 is a block diagram of a touch screen device according to an embodiment of the present invention.

FIG. 5 is a block diagram illustrating a touch screen device according to an embodiment of the present invention.

Referring to FIG. 5, the device includes a touch screen display 510, a map data provider 520, a memory 530, a communication unit 540, and a processor 550.

The touch screen display 510 displays visual information and detects touch inputs. For example, the touch screen 510 displays a status, alphanumeric character, image, video, etc., in a visual format that can be viewed by a user under the control of the processor 550. Further, the touch screen 510 provides the processor 550 with information on a position at which the touch input of the user is generated, a pressure magnitude, a pressure range, etc. For example, for the display function, the touch screen display 510 can include one of a Cathode Ray Tube (CRT), a Liquid Crystal Display (LCD), and an Organic Light-Emitting Display (OLED). In addition, for the input function, the touch screen display 510 can include a touch panel.

The map data provider 520 provides map data at the request of the processor 550. Herein, the map data may be stored in the memory 530 or may be stored in a remote device. When the map data is stored in the remote device, the map data provider 520 can obtain the map data by performing communication with the remote device via the communication unit 540.

The processor 550 displays the electronic map via the touch screen display 510, and changes a position and scale of the electronic map according to a user input. Accordingly, the processor 550 requests the map data provider 520 to send map data corresponding to the position and scale, and generates a map image on the basis of the map data provided from the map data provider 520. In addition, the processor 550 recognizes a user manipulation for instructing a mode transition to the variation-axis browsing mode that uses a variation axis, and sets the variation axis from the user inputs, as described above and illustrate in FIGS. 1D to 1F.

When the mode transition to the modified-axis browsing mode is instructed by the user's manipulation, the processor 550 sets the variation axis according to the user input. For example, the processor 550 determines whether two touch inputs are generated, and upon generation of the two touch inputs, sets a middle point of the touch inputs as a reference point, and sets the variation axis to a line orthogonal to a line that connects the touch inputs at the reference point. By setting the variation axis, a first area and a second area are identified by the variation axis used as a boundary, and a distortion area having a specific width about the variation axis is determined.

After setting the variation axis, upon issuing of a map shift command, the processor 550 distorts a display of the distortion area. Further, the processor 550 shifts a displayed portion of the area in which the map shift command is issued. More specifically, when the map shift command is issued in any one of the first area and the second area, the processor 550 shifts a displayed portion of that area, and maintains a displayed portion of the other area. When a touch input or drag occurs in each of the first area and the second area, the processor 550 shifts each of the displayed portion of the first area and the displayed portion of the second area independently.

If a mode transition to the normal browsing mode is instructed while operating in the modified browsing mode, the processor 550 releases the variation axis, releases the distinction of the first area, the second area, and the distortion area, and thereafter displays the entire map without distortion. As described above, the processor 550 can display the map while maintaining the displayed portion of one of the first area and the second area, without changing the scale of the map, or the processor 550 can display the map such that both of the displayed parts of the first area and the displayed portion of the second area can be viewed, by decreasing the scale of the map.

According to the above-described embodiments of the present invention, a touch screen device for displaying a map uses a variation-axis browsing mode to avoid shifting a position recognized by a user outside of a screen. Accordingly, browsing between positions recognized by the user can be easily performed. In addition, because the map can be viewed with a new scale of the map by including all areas divided along a variation axis after browsing the variation axis, a geographical relation between the positions of the user can be easily recognized.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of browsing a map displayed on a device including a touch screen display, the method comprising:
    displaying the map on a substantially full screen of the touch screen display;
    detecting a user's touch input for setting a variation axis on the map;
    setting the variation axis in any direction upon the user's touch input on the touch screen display;
    dividing the substantially full screen into a first area and a second area, using the variation axis as a boundary;
    displaying a distorted portion of the map in a distortion area;
    detecting a first map shift command from at least one area of the first area and the second area; and
    shifting a displayed portion of the map from the at least one area of the first area and the second area, in response to the first map shift command,
    wherein setting the variation axis comprises:
    detecting two touch inputs;
    setting a reference point at a middle point of the two touch inputs; and
    setting the variation axis as a line orthogonal to a line that connects the two touch inputs, passing through the reference point, and
    wherein the distortion area is between the first area and the second area and expands from the variation axis with a width in a direction perpendicular to the variation axis.

2. The method of claim 1, further comprising:
    simultaneously detecting a second map shift command in the second area, when detecting the first map shift command in the first area; and
    shifting the displayed portion of the map according to a direction of the second map shift command in the second area and shifting the displayed portion of the map according to a direction of the first map shift command in the first area.

3. The method of claim 1,
    wherein the distortion area includes a distortion type.

4. The method of claim 3, wherein the distortion type includes at least one of creased, compressed in a widthwise direction, and filled with shadow.

5. The method of claim 3, wherein the width of the distortion area is determined according to a level of shifting the map.

6. The method of claim 1, further comprising transitioning to a normal browsing mode.

7. The method of claim 6, wherein transitioning to the normal browsing mode comprises displaying the map without distortion according to a current scale of the map while maintaining any one of the displayed portions of the first area and the second area.

8. The method of claim 6, wherein transitioning to the normal browsing mode comprises displaying the map without distortion by decreasing a scale of the map while including the displayed portions of the first area and the second area.

9. An apparatus for providing a map display function, the apparatus comprising:
    a map data provider for providing map data for the map display function;
    a touch screen display for displaying a map based on the map data on a substantially full screen of the touch screen display, and detecting a user's touch input for setting a variation axis on the map; and
    a processor for setting the variation axis in any direction upon the user's touch input on the touch screen display, for dividing the substantially full screen into a first area and a second area, using the variation axis used as a boundary, for controlling the touch screen to display a distorted portion of the map in a distortion area, and when a first map shift command is detected from at least one area of the first area and the second area by the touch screen display, shifting a displayed portion of the map from the at least one area of the first area and the second area, in response to the first map shift command,
    wherein the processor sets the variation axis by receiving two touch inputs from the touch screen display, sets a reference point at a middle point of the two touch inputs, and sets the variation axis as a line orthogonal to a line that connects the two touch inputs, passing through the reference point, and,
    wherein the distortion area is between the first area and the second area and expands from the variation axis with a width in a direction perpendicular to the variation axis.

10. The apparatus of claim 9, wherein the processor shifts the displayed portion of the map according to a direction of the second map shift command in the second area and shifts the displayed portion of the map according to a direction of the first map shift command in the first area, when a second map shift command is simultaneously detected by the touch screen display the in the second area when detecting the first map shift command in the first area.

11. The apparatus of claim 9, wherein the distortion area includes a distortion type.

12. The apparatus of claim 11, wherein the distortion type includes at least one of creased, compressed in a widthwise direction, and filled with shadow.

13. The apparatus of claim 11, wherein the width of the distortion area is determined by the processor according to a level of shifting the map.

14. The apparatus of claim 9, wherein the processor transits a normal browsing mode.

15. The apparatus of claim 14, wherein the processor transitions the apparatus from a variation-axis browsing mode to the normal browsing mode by controlling the touch screen display to display the map without distortion, according to a current scale of the map while maintaining any one of the displayed portions of the first area and the second area.

16. The apparatus of claim 9, wherein the processor transitions the apparatus from a variation-axis browsing mode to a normal browsing mode by controlling the touch screen display to display the map without distortion, by decreasing a scale of the map while including the displayed portions of the first area and the second area.

17. The apparatus of claim 9, further comprising a memory for storing the map data.

18. The apparatus of claim 9, further comprising a communication unit for communicating with an external device that stores the map data.

* * * * *